(12) United States Patent
Park et al.

(10) Patent No.: US 11,307,726 B2
(45) Date of Patent: Apr. 19, 2022

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Sang Jin Park, Gyeonggi-do (KR); Do Hyoung Kwon, Gyeonggi-do (KR); Cheol Hun Lee, Gyeonggi-do (KR); Sung Jin Noh, Gyeonggi-do (KR); Jun Gu Lee, Gyeonggi-do (KR); Ki Joon Park, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/149,960

(22) Filed: Jan. 15, 2021

(65) Prior Publication Data

US 2021/0223918 A1 Jul. 22, 2021

(30) Foreign Application Priority Data

Jan. 22, 2020 (KR) .......................... 10-2020-0008795

(51) Int. Cl.
*G06F 3/044* (2006.01)

(52) U.S. Cl.
CPC .......... *G06F 3/0448* (2019.05); *G06F 3/0443* (2019.05); *G06F 3/0446* (2019.05); *G06F 2203/04111* (2013.01)

(58) Field of Classification Search
None
See application file for complete search history.

(56) References Cited

U.S. PATENT DOCUMENTS

| 10,037,109 | B2 * | 7/2018 | Yashiro | ................ G06F 3/0445 |
| 2014/0332262 | A1 * | 11/2014 | Yoshiki | ................ H05K 1/0274 |
| | | | | 174/264 |
| 2017/0344162 | A1 * | 11/2017 | Lee | ................ G06F 3/0443 |
| 2019/0163306 | A1 * | 5/2019 | Wang | ................ G06F 3/044 |

FOREIGN PATENT DOCUMENTS

WO    WO 2013/063176 A1    5/2013

\* cited by examiner

*Primary Examiner* — Duane N Taylor, Jr.
(74) *Attorney, Agent, or Firm* — The PL Law Group, PLLC (57) ABSTRACT

A touch sensor according to an embodiment of the present invention includes a substrate layer, sensing electrodes arranged on a top surface of the substrate layer, the sensing electrodes having boundaries in which a plurality of convex portions are connected, and a dummy electrode disposed between the sensing electrodes, the dummy electrode having a boundary in which a plurality of convex portions are connected. The sensing electrodes include a first sensing electrode arranged in a column direction and a second sensing electrode arranged in a row direction. A convex portion in a region where the first sensing electrode, the second sensing electrode and the dummy electrode are adjacent to each other has a radius of curvature less than that of a convex portion in other regions.

13 Claims, 7 Drawing Sheets

TOUCH SENSOR AND IMAGE DISPLAY DEVICE INCLUDING THE SAME

CROSS-REFERENCE TO RELATED APPLICATION AND CLAIM OF PRIORITY

This application claims priority to Korean Patent Applications No. 10-2020-0008795 filed on Jan. 22, 2020 in the Korean Intellectual Property Office (KIPO), the entire disclosure of which is incorporated by reference herein.

BACKGROUND

1. Field

The present invention relates to a touch sensor and an image display device including the same. More particularly, the present invention relates to a touch sensor including patterned sensing electrodes and an image display device including the same.

2. Description of the Related Art

As information technologies are being developed, various demands in display devices having thinner dimension, lightweight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

In the touch sensor, sensing electrodes formed of a conductive material such as a metal for a touch sensing may be arranged on a substrate. However, when the touch sensor is inserted in the display device, an image quality implemented from the image display device may be degraded by the sensing electrodes. For example, the sensing electrodes may be visually recognized by the user to disturb the image.

Thus, construction of the sensing electrodes having improved optical and visual properties while maintaining desired electrical properties of the touch sensing is required.

For example, as disclosed in Korean Patent Application Publication No. 2014-0092366, various image display devices combined with a touch screen panel including a touch sensor has been developed recently. However, the touch sensor or the touch panel having improved optical and visual properties is continuously demanded.

SUMMARY

According to an aspect of the present invention, there is provided a touch sensor having improved optical and electrical properties.

According to an aspect of the present invention, there is provided an image display device including the touch sensor.

The above aspects of the present inventive concepts will be achieved by the following features or constructions:

(1) A touch sensor, including: a substrate layer; sensing electrodes arranged on a top surface of the substrate layer, the sensing electrodes having boundaries in which a plurality of convex portions are connected; and a dummy electrode disposed between the sensing electrodes, the dummy electrode having a boundary in which a plurality of convex portions are connected, wherein the sensing electrodes include a first sensing electrode arranged in a column direction and a second sensing electrode arranged in a row direction, and a convex portion in a region where the first sensing electrode, the second sensing electrode and the dummy electrode are adjacent to each other has a radius of curvature less than that of a convex portion in a region where only two of the first sensing electrode, the second sensing electrode and the dummy electrode are adjacent to each other.

(2) The touch sensor according to the above (1), further including a first separation region spacing the first sensing electrode and the second sensing electrode from each other, a second separation region spacing the first sensing electrode and the dummy electrode from each other, and a third separation region spacing the second sensing electrode and the dummy electrode from each other.

(3) The touch sensor according to the above (2), wherein the convex portions include: a first convex portion formed in an intersection area of the first separation region, the second separation region and the third separation region; and a second convex portion defined solely by the first separation region, the second separation region or the third separation region.

(4) The touch sensor according to the above (3), wherein the first convex portion has a radius of curvature less than that of the second convex portion.

(5) The touch sensor according to the above (4), wherein the radius of curvature of the first convex portion is less than 0.05.

(6) The touch sensor according to the above (1), wherein the dummy electrode includes: a first dummy electrode disposed between the first sensing electrode and the second sensing electrode neighboring each other; and a second dummy electrode surrounded by four sensing electrodes of the sensing electrodes.

(7) The touch sensor according to the above (6), wherein the second dummy electrode has an X-shape.

(8) The touch sensor according to the above (1), wherein the boundaries of the sensing electrodes and the dummy electrode have an amorphous wavy shape.

(9) The touch sensor according to the above (1), further including a floating electrode formed at an inside of each of the sensing electrodes.

(10) The touch sensor according to the above (9), wherein a boundary of the floating electrode has an amorphous wavy shape.

(11) The touch sensor according to the above (1), wherein the boundaries of the sensing electrodes are defined by setting an assembly of imaginary square unit cells that have sides deformed into a wavy shape, and then round-treating regions at which vertices the unit cells are located in a boundary of the assembly.

(12) The touch sensor according to the above (1), wherein the first sensing electrode comprises a plurality of first sensing electrodes and the second sensing electrode comprises a plurality of second sensing electrodes, wherein the touch sensor further includes a bridge electrode electrically connecting first sensing electrodes neighboring in the column direction of the plurality of first sensing electrodes; and a connecting portion integrally connecting second sensing electrodes neighboring in the row direction of the plurality of second sensing electrodes.

(13) A window stack structure, including: a window substrate; and the touch sensor according to embodiments as described above stacked on the window substrate.

(14) An image display device, including: a display panel; and the touch sensor according to embodiments as described above stacked on the display panel.

In a touch sensor according to embodiments of the present invention, a periphery of a sensing electrode may be formed so that a plurality of convex portions may be connected, and the periphery may include convex portions having different radii of curvature. A dummy electrode having a periphery of a random wavy shape may be included between neighboring sensing electrodes.

The periphery of the sensing electrode may be formed in a substantially random shape, so that electrode visibility and moiré phenomena caused by a regular repetition of an electrode pattern may be prevented In exemplary embodiments, the convex portion of the sensing electrode adjacent to an end portion of the dummy electrode may have a relatively small radius of curvature. Accordingly, an electrode visual recognition occurring at an intersection between the sensing electrodes and the dummy electrode may be further reduced.

DETAILED DESCRIPTION

According to exemplary embodiments of the present invention, there is provided a touch sensor including sensing electrodes and dummy electrodes and having improved visual property while preventing an electrode recognition. Further, a window stack structure and an image display device including the touch sensor are provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying drawings, two directions that are parallel to a top surface of a touch sensor or a substrate layer 100 and cross each other are defined as a first direction and a second direction. For example, the first direction and the second direction may be perpendicular to each other.

The terms "first", "second", "row direction" and "column direction" used herein are used to relatively designate different elements and directions crossing each other, and not to indicate absolute order and directions.

Figure 1:
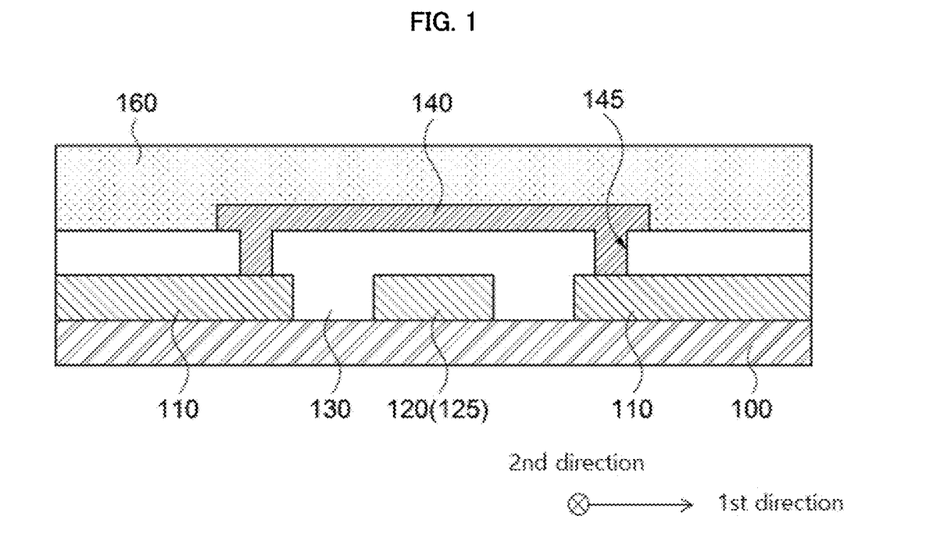
FIGS. 1 and 2 are a schematic cross-sectional view and schematic a top planar view, respectively, illustrating a touch sensor in accordance with exemplary embodiments.
Figure 2:
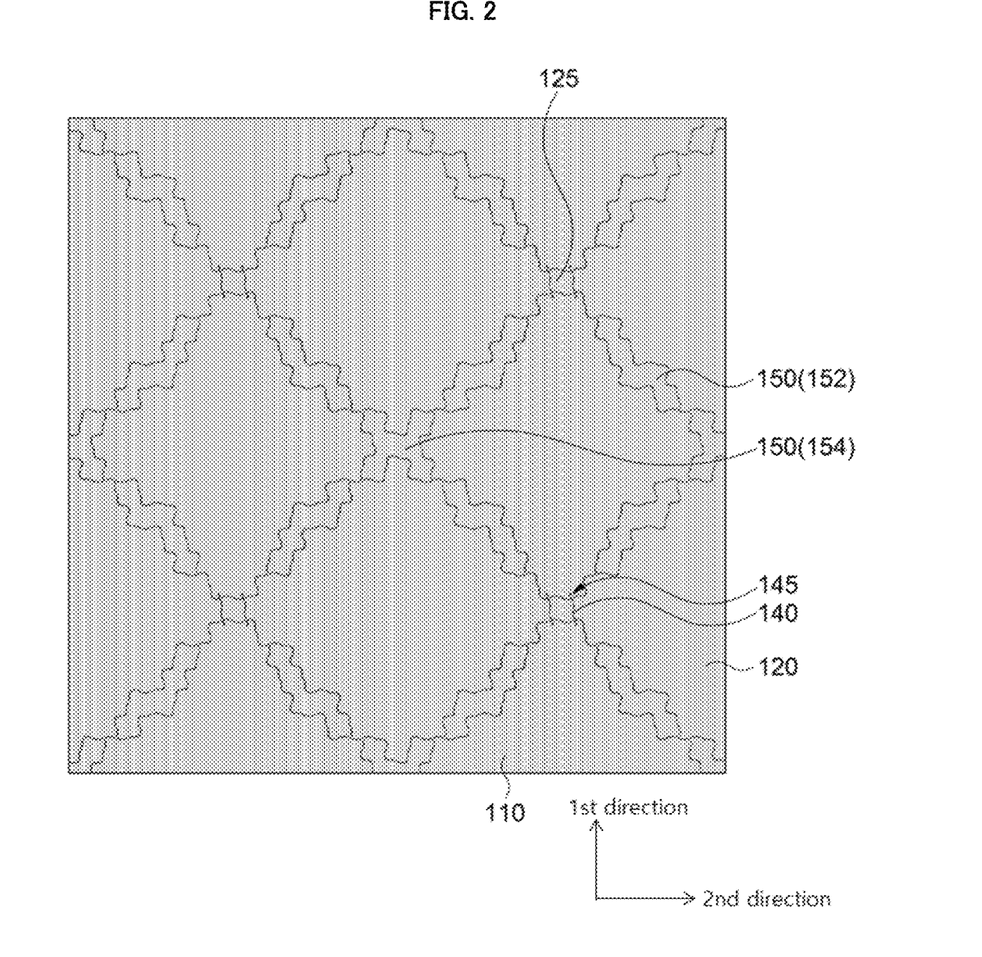

FIGS. 1 and 2 are a schematic cross-sectional view and schematic a top planar view, respectively, illustrating a touch sensor in accordance with exemplary embodiments. For example, FIG. 1 provides an example of a touch sensor having a top bridge construction.

Referring to FIGS. 1 and 2, the touch sensor may include the substrate layer 100 and sensing electrodes 110 and 120 arranged on the substrate layer 100.

The substrate layer 100 may include a film-type member used as a base layer for forming the sensing electrodes 110 and 120 or an object on which the sensing electrodes 110 and 120 are formed. In some embodiments, the substrate layer 100 may refer to a display panel on which the sensing electrodes 110 and 120 are directly formed.

For example, the substrate layer 100 may include a substrate or a film material commonly used in a touch sensor. For example, the substrate layer 100 may include glass, polymer and/or an inorganic insulation material. The polymer may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc. The inorganic insulation material may include, e.g., silicon oxide, silicon nitride, silicon oxynitride, a metal oxide, etc.

In some embodiments, a layer or a film member in an image display device to which the touch sensor is applied may also serve as the substrate layer 100. For example, an encapsulation layer or a passivation layer included in a display panel may serve as the substrate layer 100.

The sensing electrodes 110 and 120 may include first sensing electrodes 110 and second sensing electrodes 120. For example, the sensing electrodes 110 and 120 may be arranged to be operated in a mutual capacitance type.

The first sensing electrodes 110 may be arranged along the first direction (e.g., a column direction or a length direction). Each of the first sensing electrodes 110 may have an independent island pattern shape, and the first sensing electrodes 110 neighboring each other in the first direction may be electrically connected to each other by a bridge electrode 140.

Accordingly, a first sensing electrode column extending in the first direction may be defined, and a plurality of the first sensing electrode columns may be arranged along the second direction.

The second sensing electrodes 120 may be arranged along the second direction. The second sensing electrodes 120 neighboring in the second direction may be connected to each other by a connecting portion 125. The second sensing electrodes 120 and the connecting portion 125 may be integrally connected to each other to be substantially provided as a single member. In this case, the second sensing electrodes 120 and the connecting portion 125 may be formed by patterning the same conductive layer, and may be positioned at the same layer or at the same level.

Accordingly, a second sensing electrode row extending in the second direction may be defined, and a plurality of the second sensing electrode rows may be arranged along the first direction.

An insulating layer 130 covering the sensing electrodes 110 and 120 may be formed on the substrate layer 100. The bridge electrode 140 may be disposed on the insulating layer 130 to electrically connect the neighboring first sensing electrodes 110 to each other through, e.g., a contact region 145 formed in the insulating layer 130.

A passivation layer 160 covering the bridge electrode 140 may be formed on the insulating layer 130.

The insulating layer 130 and/or the passivation layer 160 may include an inorganic insulating material such as silicon oxide or silicon nitride, or an organic insulating material such as an epoxy-based resin, an acrylic resin, a siloxane-based resin, a polyimide-based resin, etc.

A dummy electrode 150 may be disposed between neighboring sensing electrodes 110 and 120. The dummy electrode 150 may be positioned at the same layer or at the same level (e.g., on the top surface of the substrate layer 100) together with the sensing electrodes 110 and 120.

The dummy electrode 150 may include a first dummy electrode 152 disposed between sides of the first sensing electrode 110 and the second sensing electrode 120 neighboring each other, and a second dummy electrode 154 surrounded by four sensing electrodes 110 and 120 neighboring each other. For example, the second dummy electrode 154 may have a substantially X-shape.

In exemplary embodiments, the sensing electrodes 110 and 120, the bridge electrode 140 and the dummy electrode 150 may each include a transparent conductive oxide. For example, the transparent conductive oxide may include indium tin oxide (ITO), indium zinc oxide (IZO), zinc oxide (ZnO), indium zinc tin oxide (IZTO), cadmium tin oxide (CTO), or the like. These may be used alone or in combination thereof.

In some embodiments, the sensing electrodes 110 and 120, the bridge electrode 140 and the dummy electrode 150 may include a metal. For example, the sensing electrodes 110 and 120, the bridge electrode 140 and the dummy electrode 150 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy containing at least one therefrom (e.g., silver-palladium-copper (APC) or copper-calcium (CuCa)).

In some embodiments, the sensing electrodes 110 and 120, the bridge electrode 140 and the dummy electrode 150 may have a multi-layered structure including a transparent conductive oxide layer and a metal layer. For example, the sensing electrodes 110 and 120, the bridge electrode 140 and the dummy electrode 150 may each have a double-layered structure of a transparent conductive oxide layer-metal layer or a triple-layered structure of a transparent conductive oxide layer-metal layer-transparent conductive oxide layer. In this case, a flexible property may be enhanced by the metal layer and a resistance may be reduced so that a signal transfer speed may be also improved. Further, a resistance to corrosion and a transparency may be enhanced by the transparent conductive oxide layer.

FIG. 1 illustrates an example of the top bridge type touch sensor, but the touch sensor may have a bottom bridge structure. In this case, the bridge electrode 140 may be formed on the substrate layer 100, and the insulating layer 130 including a contact hole partially exposing the bridge electrode 140 may be formed on the bridge electrode 140. The sensing electrodes 110 and 120 and the dummy electrode 150 may be formed on the insulating layer 130, and the first sensing electrodes 110 neighboring each other may be electrically connected to each other by the bridge electrode 140 through the contact hole.

Figure 3:
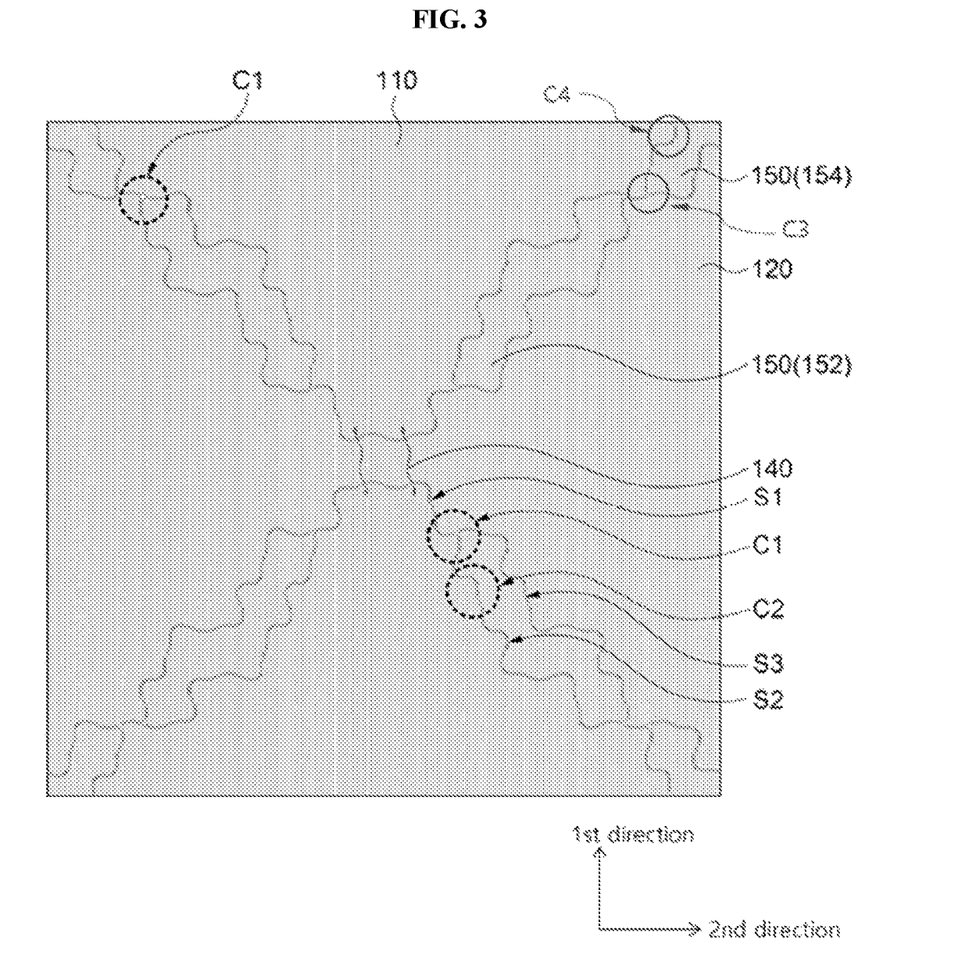
FIG. 3 is a partially enlarged top planar view illustrating an electrode construction of a touch sensor in accordance with exemplary embodiments.

FIG. 3 is a partially enlarged top planar view illustrating an electrode construction of a touch sensor in accordance with exemplary embodiments. Specifically, FIG. 3 is an enlarged top plan view illustrating the sensing electrodes 110 and 120 and the dummy electrode 150 around the bridge electrode 140 of the touch sensor.

Referring to FIG. 3, peripheries or boundaries of the sensing electrodes 110 and 120 may have a substantially amorphous wavy shape. The term "amorphous" used in the present application means a shape deviated from a regular shape in which a specific waveform is regularly repeated by a constant period.

In exemplary embodiments, the boundaries of the sensing electrodes 110 and 120 and the dummy electrode 150 may each have an amorphous wavy shape. Accordingly, the electrode visual recognition caused by a regular repetition of the electrode boundaries may be prevented. Additionally, a moiré phenomenon occurring due to a regular overlap with a pixel structure of a display panel on which a touch sensor is mounted may also be effectively prevented.

The first sensing electrode 110, the second sensing electrode 120 and the dummy electrode 150 may be separated by separation regions to define each boundary. As illustrated in FIG. 3, the first sensing electrode 110 and the second sensing electrode 120 may be separated from each other by a first separation region S1. The first sensing electrode 110 and the dummy electrode 150 may be separated from each other by a second separation region S2. The second sensing electrode 120 and the dummy electrode 150 may be separated from each other by a third separation region S3.

The boundaries of the sensing electrodes 110 and 120 may be formed by a plurality of convex portions connected to each other. In exemplary embodiments, the sensing electrodes 110 and 120 may include convex portions having different radii of curvature.

The convex portions may include a first convex portion C1, C3 and a second convex portion C2, C4. The first convex portion C1, C3 may be a convex portion included in the sensing electrodes 110 and 120 in a region where the first sensing electrode 110, the second sensing electrode 120 and the dummy electrode 150 are adjacent to each other.

For example, the first convex portion C1 may be a convex portion of the sensing electrodes 110 and 120 at an intersection area of the first separation region S1, the second separation region S2 and the third separation region S3.

The second convex portion C2 may be a convex portion defined solely by the first separation region S1, the second separation region S2 or the third separation region S3. For example, the second convex portion C2 may be a convex portion C3 in a region where only two of the first sensing electrode 110, the second sensing electrode 120 and the dummy electrode 150 are adjacent to each other.

In exemplary embodiments, a radius of curvature of the first convex portion C1 may be smaller than a radius of curvature of the second convex portion C2. For example, the radius of curvature (R) of the first convex portion C1 may be less than 0.05, and the radius of curvature (R) of the second convex portion C2 may be 0.05 or more.

In some embodiments, the radius of curvature of the first convex portion C1 may be from 0.01 to 0.03, and the radius of curvature of the second convex portion C2 may be from 0.05 to 0.2.

The dummy electrodes 150 may also include convex portions along profiles of the first and second separation regions S2 and S3 as described above. A convex portion of the dummy electrode 150 at the intersection area of the separation regions S1, S2 and S3 may also have a radius of curvature smaller than those of other convex portions.

As described above, the radius of curvature of the convex portion at the intersection area of the separation regions S1, S2, and S3 may be relatively reduced. Accordingly, the convex portion may sufficiently fill the intersection area to reduce an empty space generated in the intersection area. Accordingly, the electrode visual recognition due to a difference in reflectance and refractive index in the intersection area may be suppressed.

Additionally, the dummy electrode 150 may be added to a space between the first and second sensing electrodes 110 and 120, so that a space devoid of a conductive material may be reduced, thereby effectively suppressing the electrode visual recognition.

Figure 4:
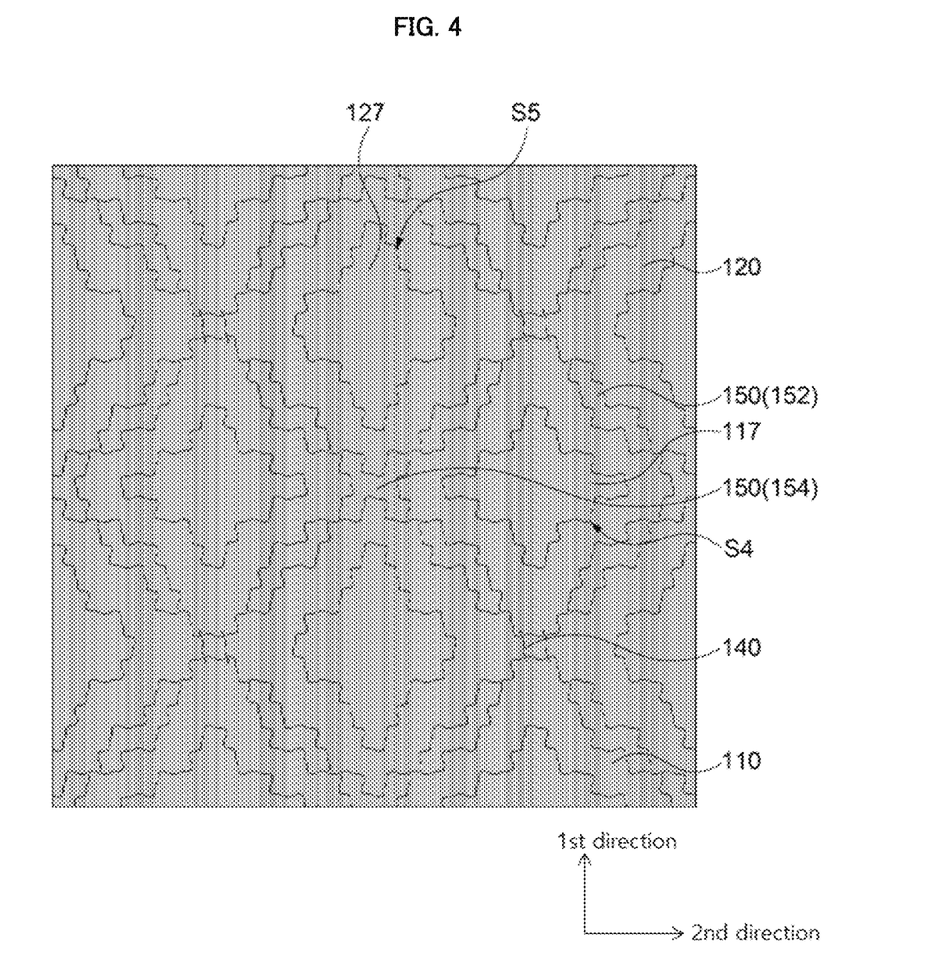
FIG. 4 is a partially enlarged top planar view illustrating a touch sensor in accordance with exemplary embodiments.

FIG. 4 is a partially enlarged top planar view illustrating a touch sensor in accordance with exemplary embodiments. Detailed descriptions of elements and structures substantially the same as or similar to those described with reference to FIGS. 1 to 3 are omitted herein.

Referring to FIG. 4, floating electrodes 117 and 127 may be formed at an inside of the sensing electrodes 110 and 120. A first floating electrode 117 may be disposed at an inside of the first sensing electrode 110, and a second floating electrode 127 may be disposed at an inside of the second sensing electrode 120.

For example, the first sensing electrode 110 and the first floating electrode 117 may be separated and spaced apart from each other by a fourth separation region S4 formed in the first sensing electrode 110. The second sensing electrode 120 and the second floating electrode 127 may be separated and spaced apart from each other by a fifth separation region S5 formed in the second sensing electrode 120.

The floating electrodes 117 and 127 may serve as adjusting electrodes of a capacitance generated by the sensing electrodes 110 and 120. For example, the capacitance generated by the sensing electrodes 110 and 120 may be finely adjusted by adjusting areas of the floating electrodes 117 and 127.

In some embodiments, boundaries of the floating electrodes 117 and 127 may also have an amorphous wavy shape including convex portions having different radii of curvature. Thus, the moiré phenomenon may be further prevented through the floating electrodes 117 and 127.

Figure 5:
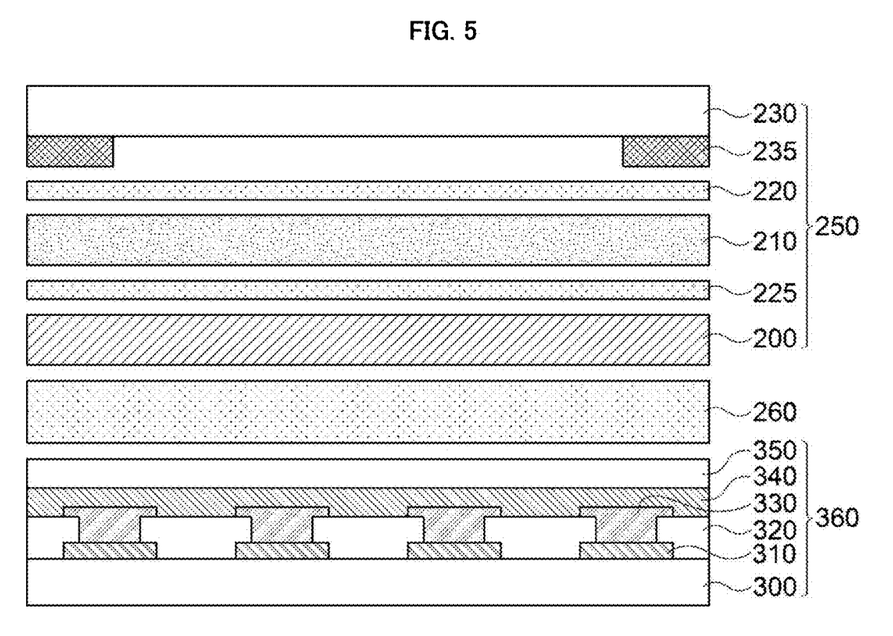
FIG. 5 is a schematic cross-sectional view illustrating a window stack structure and an image display device in accordance with exemplary embodiments.

FIG. 5 is a schematic cross-sectional view illustrating a window stack structure and an image display device in accordance with exemplary embodiments.

Referring to FIG. 5, a window stack structure 250 may include a window substrate 230, a polarizing layer 210 and a touch sensor 200 according to exemplary embodiments as described above.

The window substrate 230 may include, e.g., a hard coating film. In an embodiment, a light-shielding pattern 235 may be formed on a peripheral portion of a surface of the window substrate 230. The light-shielding pattern 235 may include a color-printed pattern, and may have a single-layered or multi-layered structure. A bezel portion or a non-display region of the image display device may be defined by the light-shielding pattern 235.

The polarizing layer 210 may include a coating-type polarizer or a polarizing plate. The coating-type polarizer may include a liquid crystal coating layer that may include a cross-linkable liquid crystal compound and a dichroic dye. In this case, the polarizing layer 210 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 210 may be directly attached to the surface of the window substrate 230 or may be attached via a first adhesive layer 220.

The touch sensor 200 may be included in the window stack structure 250 as a film or a panel. In an embodiment, the touch sensor 200 may be combined with the polarizing layer 210 via a second adhesive layer 225.

As illustrated in FIG. 5, the window substrate 230, the polarizing layer 210 and the touch sensor 200 may be sequentially positioned from a viewer's side. In this case, the sensing electrodes of the touch sensor 200 may be disposed under the polarizing layer 210 so that electrode patterns may be effectively prevented from being recognized by the viewer.

If the touch sensor 200 includes a substrate, the substrate may include, e.g., triacetyl cellulose, cycloolefin, cycloolefin copolymer, polynorbornene copolymer, or the like, and preferably, may have an in-plane retardation value of ±2.5 nm or less.

In an embodiment, the touch sensor 200 may be directly transferred to the window substrate 230 or the polarizing layer 210. In an embodiment, the window substrate 230, the touch sensor 200 and the polarizing layer 210 may be sequentially positioned from the viewer's side.

The image display device may include a display panel 360 and the window stack structure 250 disposed on the display panel 360.

The display panel 360 may include a pixel electrode 310, a pixel defining layer 320, a display layer 330, an opposing electrode 340 and an encapsulation layer 350 disposed on a panel substrate 300.

A pixel circuit including a thin film transistor (TFT) may be formed on the panel substrate 300, and insulation layer covering the pixel circuit may be formed. The pixel electrode 310 may be electrically connected to, e.g., a drain electrode of the TFT on the insulation layer.

The pixel defining layer 320 may be formed on the insulation layer, and the pixel electrode 310 may be exposed through the pixel defining layer 320 such that a pixel region may be defined. The display layer 330 may be formed on the pixel electrode 310, and the display layer 330 may include, e.g., a liquid crystal layer or an organic light emitting layer.

The opposing electrode 340 may be disposed on the pixel defining layer 320 and the display layer 330. The opposing electrode 340 may serve as, e.g., a common electrode or a cathode of the image display device. The encapsulation layer 350 may be disposed on the opposing electrode 340 to protect the display panel 360.

In some embodiments, the display panel 360 and the window stack structure 250 may be combined with each other through an adhesive layer 260. For example, a thickness of the adhesive layer 260 may be greater than each thickness of the first adhesive layer 220 and the second adhesive layer 225. A viscoelasticity of the adhesive layer 260 may be about 0.2 MPa or less at a temperature ranging from −20° C. to 80° C. In this case, a noise from the display panel 360 may be blocked, and an interface stress while being bent may be alleviated so that damages of the window stack structure 250 may be avoided. In an embodiment, the viscoelasticity of the adhesive layer 260 may be in a range from about 0.01 MPa to about 0.15 MPa.

The touch sensor 200 may include the dummy electrode and the sensing electrode having the shape and construction according to exemplary embodiments as described above. Accordingly, improved visual properties may be implemented while minimizing a degradation of an image quality from the display panel 360.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLE

Figure 6:
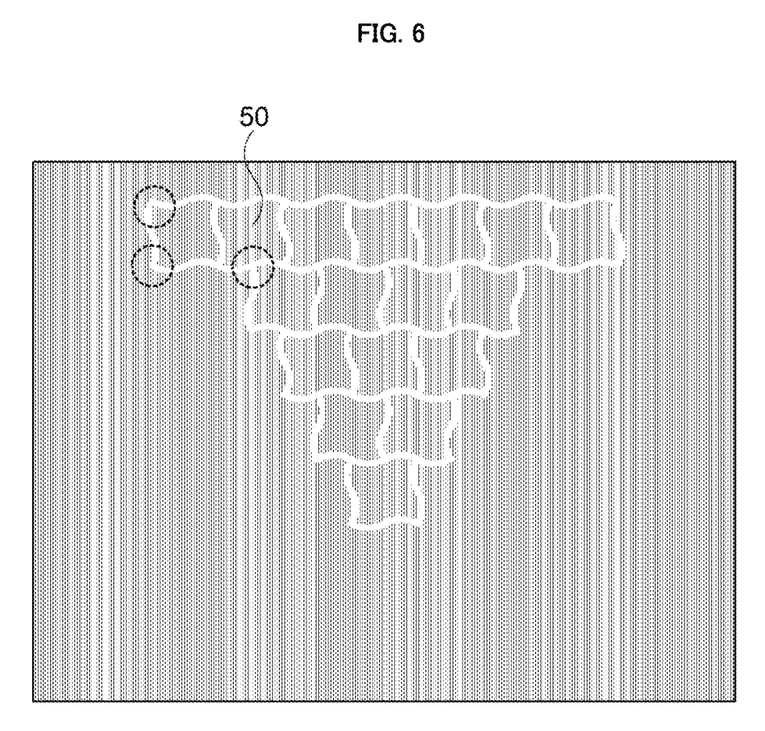
FIG. 6 a partially enlarged top planar view for describing a method of forming boundaries of a sensing electrode and a dummy electrode in Example.
Figure 7:
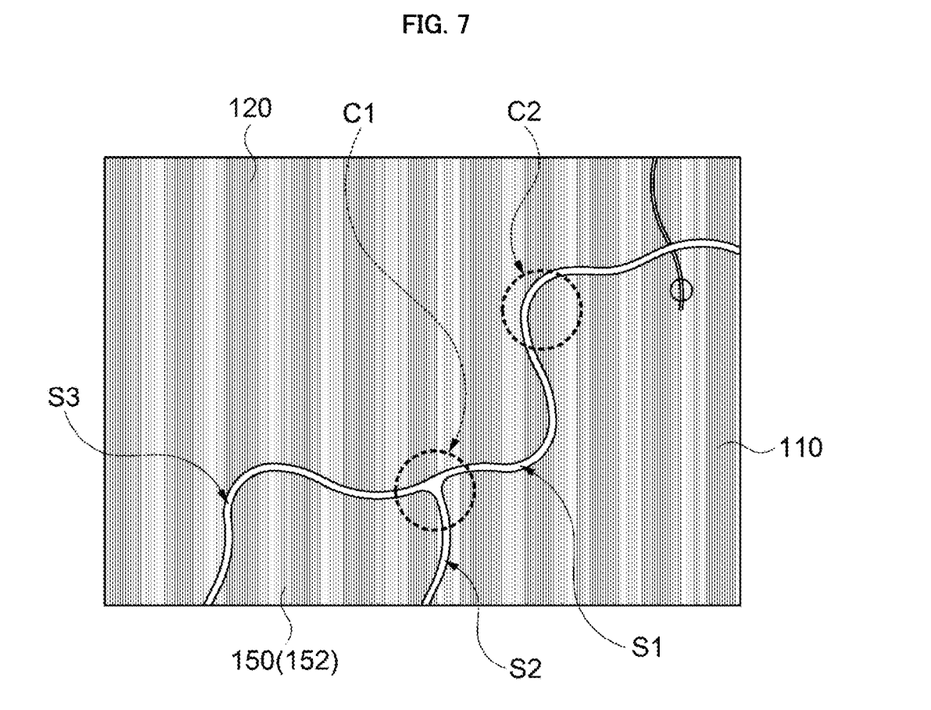
FIG. 7 a partially enlarged top planar view illustrating a construction of radii of curvature in Example.

FIG. 6 a partially enlarged top planar view for describing a method of forming boundaries of a sensing electrode and a dummy electrode in Example. FIG. 7 a partially enlarged top planar view illustrating a construction of radii of curvature in Example.

Referring to FIG. 6, square unit cells 50 each side of which is transformed into a water wave (e.g., a sine wave) are set. The unit cells 50 are horizontally assembled such that vertices of the unit cells are offset or staggered in a zigzag configuration to form a preliminary boundary by a periphery of an assembly of the unit cells.

Thereafter, as indicated by a dotted circle, corner portions at which each vertex of the unit cell 50 is positioned are round-treated. The round-treated preliminary boundary of the assembly may be determined as the boundaries of the sensing electrodes 110 and 120 as described with reference to FIGS. 2 and 3.

Specifically, a metal film (an APC alloy film, thickness: 500 Å) was deposited on a COP substrate, and the metal film was etched to form separated regions by the boundary determination method as described with reference to FIG. 6. Accordingly, a first sensing electrode, a second sensing electrode and a dummy electrode were formed in the shape illustrated in FIG. 3.

As illustrated in FIG. 7, a radius of curvature of the first convex portion C1 at the intersection area of the first to third separation regions S1, S2 and S3 was 0.02, and a radius of curvature of the second convex portion C2 defined solely by the first separation region S1 was 0.06.

Comparative Example

A touch sensor sample was manufactured by the same method as that in Example except that the radii of curvature of the first convex portion C1 and the second convex portion C2 were all 0.05.

Experimental Example

The touch sensor samples of Example and Comparative Example were laminated on a display panel test sample obtained from a commercially available mobile display product. A width direction of the display panel test sample was set as 0°, and then the touch sensor sample was tilted while changing an angle in a clockwise direction. A moiré pattern was observed according to the tilting angle, and a moiré generation level was evaluated in five grades from Lv.0 (minimum moiré) to Lv.5 (maximum moiré).

Specifically, a contrast and a pattern period of the generated moiré pattern were observed by 10 panels to select the level, and the level values were averaged to evaluate the moiré generation level.

The moiré generation level was evaluated based on standards as follows:
i) Lv.0: moiré was not recognized.
ii) Lv.1: contrast weak/frequency high (approximately 0~1 mm pattern period)
iii) Lv.2: contrast weak/frequency middle (approximately 2~3 mm pattern period)
iv) Lv.3: contrast weak/frequency low (approximately 4~5 mm pattern period)
v) Lv.4: contrast middle/frequency middle (approximately 2~3 mm pattern period)
vi) Lv.5: contrast middle/frequency low (approximately 4~5 mm pattern period)

Additionally, the touch sensor samples of Example and Comparative Example were observed by 10 panels, and an electrode visual recognition was scored between 0 (an electrode was not visually recognized) and 10 (an electrode shape was clearly visible). The scores of 10 panels were averaged to evaluate the electrode visibility.

TABLE 1

| | Moiré evaluation | Electrode Visibility evaluation |
|---|---|---|
| Example | Lv. 3 | 5 |
| Comparative Example | Lv. 4 | 6 |

Referring to Table 1, the moiré phenomenon and the electrode visual recognition were effectively suppressed in Example where the radius of curvature of the first convex portion was relatively reduced.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A touch sensor, comprising:
a substrate layer;
sensing electrodes arranged on a top surface of the substrate layer, the sensing electrodes having boundaries in which a plurality of convex portions are connected; and
a dummy electrode disposed between the sensing electrodes, the dummy electrode having a boundary in which a plurality of convex portions are connected,
wherein the sensing electrodes comprise a first sensing electrode arranged in a column direction and a second sensing electrode arranged in a row direction; and
a convex portion in a region where the first sensing electrode, the second sensing electrode and the dummy electrode are adjacent to each other has a radius of curvature less than that of a convex portion in a region where only two of the first sensing electrode, the second sensing electrode and the dummy electrode are adjacent to each other,
wherein the dummy electrode comprises a first dummy electrode disposed between the first sensing electrode and the second sensing electrode neighboring each other, and a second dummy electrode surrounded by four sensing electrodes of the sensing electrodes.
2. The touch sensor according to claim 1, further comprising a first separation region spacing the first sensing electrode and the second sensing electrode from each other, a second separation region spacing the first sensing electrode and the dummy electrode from each other, and a third separation region spacing the second sensing electrode and the dummy electrode from each other.

3. The touch sensor according to claim 2, wherein the convex portions comprise:
   a first convex portion formed in an intersection area of the first separation region, the second separation region and the third separation region; and
   a second convex portion defined solely by the first separation region, the second separation region or the third separation region.

4. The touch sensor according to claim 3, wherein the first convex portion has a radius of curvature less than that of the second convex portion.

5. The touch sensor according to claim 4, wherein the radius of curvature of the first convex portion is less than 0.05.

6. The touch sensor according to claim 1, wherein the second dummy electrode has an X-shape.

7. The touch sensor according to claim 1, wherein the boundaries of the sensing electrodes and the dummy electrode have an amorphous wavy shape.

8. The touch sensor according to claim 1, further comprising a floating electrode formed at an inside of each of the sensing electrodes.

9. The touch sensor according to claim 8, wherein a boundary of the floating electrode has an amorphous wavy shape.

10. The touch sensor according to claim 1, wherein the boundaries of the sensing electrodes are defined by setting an assembly of imaginary square unit cells that have sides deformed into a wavy shape, and then round-treating regions at which vertices the unit cells are located in a boundary of the assembly.

11. The touch sensor according to claim 1, wherein the first sensing electrode comprises a plurality of first sensing electrodes and the second sensing electrode comprises a plurality of second sensing electrodes,
   wherein the touch sensor further comprises:
      a bridge electrode electrically connecting first sensing electrodes neighboring in the column direction of the plurality of first sensing electrodes; and
      a connecting portion integrally connecting second sensing electrodes neighboring in the row direction of the plurality of second sensing electrodes.

12. A window stack structure, comprising:
   a window substrate; and
   the touch sensor according to claim 1 stacked on the window substrate.

13. An image display device, comprising:
   a display panel; and
   the touch sensor according to claim 1 stacked on the display panel.

* * * * *